United States Patent [19]

Ishiguro et al.

[11] 3,918,623

[45] Nov. 11, 1975

[54] METHOD OF JOINING BY DIFFUSION WELDING A HOLLOW PART OF NONFERROUS METAL ONTO THE INNER SURFACE OF A HOLLOW PART OF FERROUS METAL

[75] Inventors: Juichi Ishiguro; Matsuho Miyasaka; Nobumitsu Kitajima, all of Tokyo, Japan

[73] Assignee: Ebara Manufacturing Co., Ltd., Tokyo, Japan

[22] Filed: Apr. 2, 1975

[21] Appl. No.: 564,341

[30] Foreign Application Priority Data

| May 7, 1974 | Japan | 49-49803 |
| July 5, 1974 | Japan | 49-76437 |
| Aug. 13, 1974 | Japan | 49-92024 |

[52] U.S. Cl. ............... 228/127; 228/126; 228/193; 228/194
[51] Int. Cl.² ........................................ B23K 19/00
[58] Field of Search .......... 228/126, 127, 193, 194, 228/195, 165, 263

[56] References Cited
UNITED STATES PATENTS

| 3,481,024 | 12/1969 | Bunn | 228/127 |
| 3,559,274 | 2/1971 | Aranata | 228/127 |
| 3,762,032 | 10/1973 | Bowling et al. | 228/127 |

*Primary Examiner*—James L. Jones, Jr.
*Assistant Examiner*—Margaret Joyce
*Attorney, Agent, or Firm*—Flynn & Frishauf

[57] ABSTRACT

In a method of joining by diffusion welding a hollow part of non-ferrous metal onto the inner surface of the bore of a hollow part of ferrous metal comprising the steps of inserting said hollow part, to be joined onto said hollow part of ferrous metal, of non-ferrous metal such as copper and copper alloys with a larger coefficient of thermal expansion than said hollow part of ferrous metal into and in close contact with the bore of said hollow part of ferrous metal, then inserting a core of a material with a higher strength and a higher melting point than said hollow part of non-ferrous metal into and in close contact with the bore of said hollow part of non-ferrous metal, and subsequently heating the composite part set as mentioned above to a diffusion welding temperature under a relatively low vacuum or in a non-oxidizing atmosphere under atmospheric pressure, a hollow part of non-ferrous metal is joined by diffusion welding onto the inner surface of a hollow part of ferrous metal as follows.

3 Claims, 28 Drawing Figures

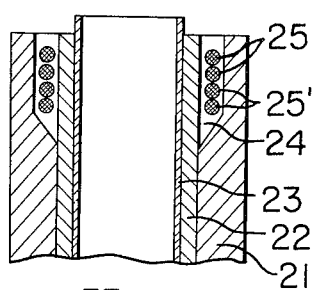
FIG. 8
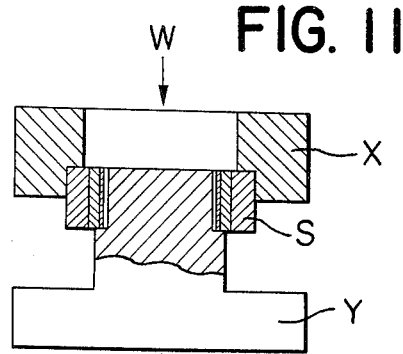
FIG. 11
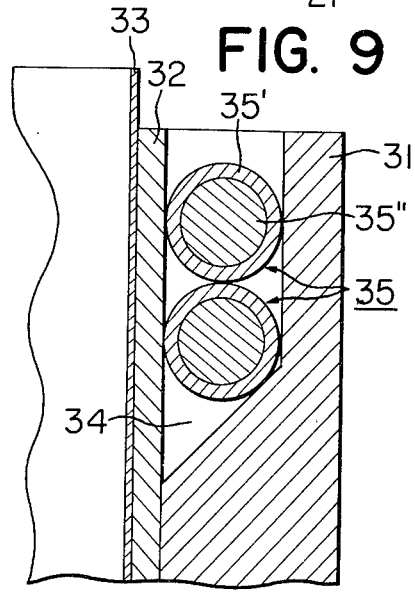
FIG. 9
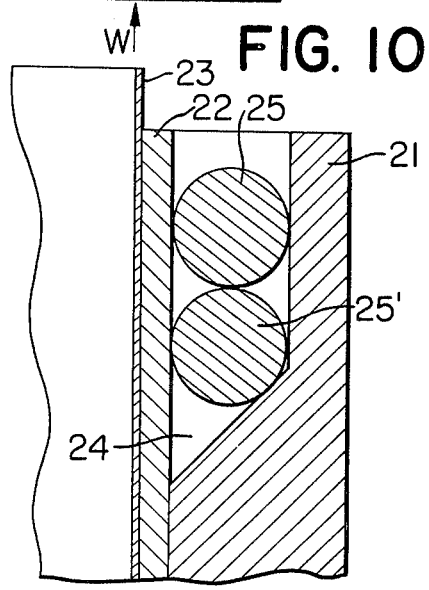
FIG. 10
FIG. 15
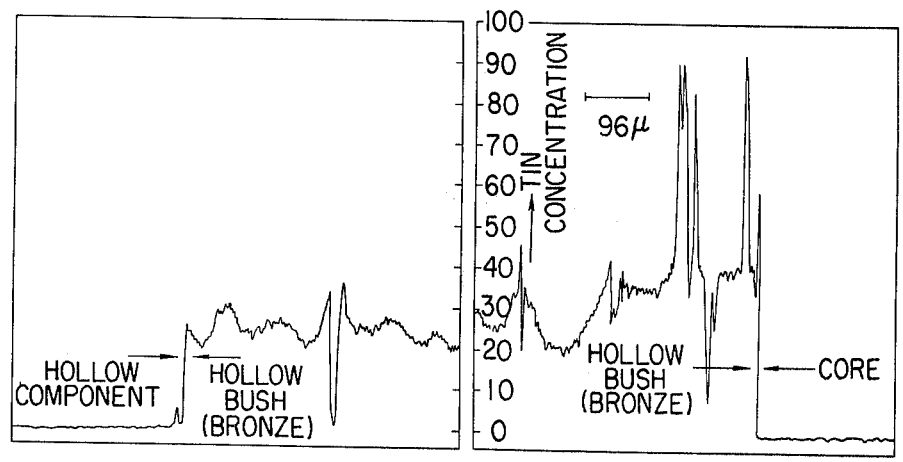

(a)

(b)

(a) (b)

(a)

(b)

(a)

(b)

(a) (b)

METHOD OF JOINING BY DIFFUSION WELDING A HOLLOW PART OF NONFERROUS METAL ONTO THE INNER SURFACE OF A HOLLOW PART OF FERROUS METAL

A low melting point metal in liquid phase having a lower melting point than said two hollow parts and said core is caused to penetrate into respective gaps formed between said two hollow parts and between said hollow part of nonferrous metal and said core. Heating to a diffusion welding temperature is then carried out to effect solid phase - liquid phase diffusion between said two hollow parts in solid phase and said low melting point metal in liquid phase. At the same time, solid phase - solid phase diffusion is effected between said two hollow parts in solid phase, by bringing said two hollow parts into contact with each other under pressure while preventing said hollow part of non-ferrous metal from being deformed inward by means of said core. Said hollow part of non-ferrous metal is joined in this way onto the inner surface of said hollow part of ferrous metal. Then, said core is removed by withdrawing, cutting or other method to produce a joined cylindrical product. An alloying metal is simultaneously, with a view to preventing an excess of said low melting point metal from forming alloying phase with low mechanical properties and corrosion resistance.

FIELD OF THE INVENTION

This invention relates to a method of joining by diffusion welding a hollow part of non-ferrous metal such as copper and copper alloys onto the inner surface of the bore of a hollow part of ferrous metal to improve the sliding property, wear resistance, corrosion resistance, etc. of the inner surface of said hollow part of ferrous metal.

BACKGROUND OF THE INVENTION

Diffusion welding is known as one of the methods of joining a hollow part of non-ferrous metal such as copper and copper alloys onto the inner surface of the bore of a hollow part of ferrous metal such as cylinder and bearing, in order to improve the sliding property, wear resistance, corrosion resistance, etc. of the inner surface of said hollow part of ferrous metal.

In the known diffusion welding, in order to bring two metal parts to be joined together into the closest possible contact with each other, the contact surfaces of these metal parts are finished to a roughness of about 8 $\mu$ and oxides and stains are removed from said contact surfaces, and then, said metal parts are heated to a temperature at which re-configuration of atoms and recrystallization occur between said metal parts in said contact surfaces, i.e., the temperature corresponding to about 40–60% of the melting points of the metals to be joined together under a vacuum of $1 \times 40^{-4}$ Torr or more or in argon atmosphere with a high purity of 99.9999% of more under atmospheric pressure while said contact surfaces are being brought into contact with each other under a pressure of about 50–200g/mm².

Therefore, the above-mentioned conventional diffusion welding requires not only special high vacuum or a special atmosphere, but also contact surfaces of metals to be joined together finished to a minimum surface roughness. In addition, a special pressurizing device must be employed. When a cylindrical hollow part of non-ferrous metal is to be joined onto the inner surface of the bore of cylindrical hollow part of ferrous metal having a shape that makes it difficult to apply pressure from the outside during heating for diffusion welding, e.g., an elongated deep bore, it is difficult to bring said contact surfaces into contact with each other under pressure in said hot pressurizing device, thus making it exceedingly difficult to apply the conventional diffusion welding to this case. Further, an expensive pressurizing device and jig are necessary for bringing said contact surfaces into contact with each other under pressure.

Accordingly, another diffusion welding has been proposed in which, as material for hollow part of non-ferrous metal to be joined onto the inner surface of the bore of a hollow part of ferrous metal, a metal with a higher coefficient of thermal expansion than the material for said hollow part of ferrous metal is selected and the difference between the inner diameter of said hollow part of ferrous metal and the outer diameter of said hollow part of nonferrous metal is minimized and which comprises, as shown in FIG. 1, inserting said hollow part of non-ferrous metal 42 into and in close contact with the bore of said hollow part of ferrous metal 41, then inserting a core 43 of a material with a higher strength and a higher melting point than said hollow part of non-ferrous metal into and in close contact with the bore of said hollow part of non-ferrous metal, fitting a weight 46 to play also a role of centering onto and in close contact with the upper end of thus set composite part, and then heating said composite part to a diffusion welding temperature under a relatively low vacuum of about 2 Torr or in a non-oxidizing atmosphere under atmospheric pressure in a treatment furnace.

According to this conventional method, said two hollow parts 41 and 42 expand both with heat applied during diffusion welding, and the gap between said two hollow parts 41 and 42 becomes gradually narrower because said hollow part of non-ferrous metal 42 has a larger coefficient of thermal expansion than said hollow part of ferrous metal 41. Said gap is rendered to null as the heating temperature rises more. Finally, stress, or pressure, generated from the difference in thermal expansion is applied to the contact surfaces of said two hollow parts 41 and 42, and said two hollow parts 41 and 42 are joined together by diffusion welding. In this case, it is necessary to raise the heating temperature to above the creep temperature of said hollow part of non-ferrous metal 42 in order to increase said stress to a level suitable for diffusion welding of said two hollow parts 41 and 42. However, the strength of said hollow part of non-ferrous metal 42 greatly decreases at such a high temperature. As a result, said stress generated from the difference in thermal expansion tends principally to deform said hollow part of nonferrous metal 42 inward and does not serve effectively to bring the contact surfaces of said two hollow parts 41 and 42 into contact with each other under pressure. However, since a core 43 with a higher strength and a higher melting point than said hollow part of non-ferrous metal 42 is inserted into and in close contact with the bore of said hollow part of non-ferrous metal 42, the inward deformation of said hollow part of non-ferrous metal 42 is prevented, and said stress generated from the difference in thermal expansion can be effectively used for bringing said two hollow parts 41 and 42 into contact with each other under pressure, namely, for diffusion welding.

Accordingly, in the above-mentioned conventional method, the necessity of a special pressurizing device is eliminated for bringing the contact surface of said two hollow parts 41 and 42 into contact with each other under pressure. Moreover, a relatively low vacuum of about 2 Torr easily obtained with an oil rotary vacuum pump suffices. However, it is necessary to minimize the difference in size between inner diameter and other diameter of said two hollow parts 41 and 42 and said core 43 within a range in which said two hollow parts and said core are capable of being brought into contact with each other, in order to use effectively the stress generated from the difference in thermal expansion of said two hollow parts 41 and 42. In addition, the contact surfaces of said two hollow parts and said core must be finished to a very small surface roughness of about 3–6 $\mu$, in order to provide narrow gaps between said hollow parts 41 and 42 and between said hollow part of non-ferrous metal 42 and said core 43, respectively. It costs a great deal to produce said two hollow parts and said core with such a small difference in size and a small surface roughness.

As mentioned above, although the conventional diffusion welding provides an excellent joining strength and has many advantages, it has some problems to be solved. However, no method for joining by diffusion welding that solves such problems has so far been proposed.

SUMMARY OF THE INVENTION

Therefore, the object of this invention is to provide an improved method of joining by diffusion welding a hollow part of non-ferrous metal onto the inner surface of the bore of a hollow part of ferrous metal that solves the above-mentioned problems.

One of the objects of this invention is to provide an improved method of joining by diffusion welding a hollow part of non-ferrous metal onto the inner surface of the bore of a hollow part of ferrous metal that requires neither special pressurizing device for bringing the contact surfaces of metals to be joined together into contact with each other under pressure nor a high vacuum or a special atmosphere, such as argon atmosphere with a high purity under atmospheric pressure.

Another object of this invention is to provide a method of joining by diffusion welding a hollow part of non-ferrous metal onto the inner surface of the bore of a hollow part of ferrous metal that can produce by a simple operation a strong and uniform joined surface which will not yield spalling or cracking, even if said hollow part of ferrous metal has an elongated deep bore.

Especially, the principal object of this invention is to provide a method of joining by diffusion welding a hollow part of non-ferrous metal onto the inner surface of the bore of a hollow part of ferrous metal that eliminates the necessity of finishing said hollow part of ferrous-metal, said hollow part of non-ferrous metal to be joined onto the inner surface of said hollow part of ferrous metal and the core to be inserted into and in close contact with the bore of said hollow part of non-ferrous metal to a small difference in size and to a small surface roughness.

In a method of joining by diffusion welding a hollow part of non-ferrous metal onto the inner surface of the bore of a hollow part of ferrous metal comprising the steps of inserting said hollow part of non-ferrous metal with a larger coefficient of thermal expansion than said hollow part of ferrous metal into and in close contact with the bore of said hollow part of ferrous metal, then inserting a core of a material with a higher strength and a higher melting point than said hollow part of non-ferrous metal into and in close contact with the bore of said hollow part of non-ferrous metal, and subsequently heating the composite part set as mentioned above to a diffusion welding temperature under a relatively low vacuum or in a non-oxidizing atmosphere under atmospheric pressure, this invention is characterized by causing a low melting point metal in liquid phase having a lower melting point than said two hollow parts and said core to penetrate into respective gaps formed between said two hollow parts and between said hollow part of non-ferrous metal and said core; than carrying out heating to a diffusion welding temperature to effect solid phase-liquid phase diffusion between said two hollow parts in solid phase and said low melting point metal in liquid phase; and, at the same time, effecting solid phase - solid phase diffusion between said two hollow parts in solid phase, by bringing said two hollow parts into contact with each other under pressure through the use of stress generated from the difference in thermal expansion between said two hollow parts while preventing said hollow part of non-ferrous metal from being deformed inward by means of said core.

BRIEF DISCRIPTION OF THE DRAWINGS

Of the drawings:

FIGS. 8 and 10 are partially enlarged schematic drawings which illustrate a variation of the second embodiment of this invention;

FIG. 9 is a partially enlarged sectional view of FIG. 6;

FIG. 11 is a schematic drawing of a joining strength measuring device for the joined composite part, diffusion welded in accordance with the method of this invention;

Figure 12:
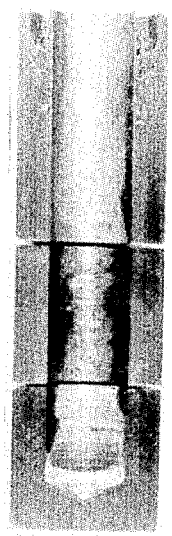
FIG. 12 is a photograph of the longitudinal section of the joined composite part, diffusion welded in accordance with the first embodiment of this invention.
Figure 14:
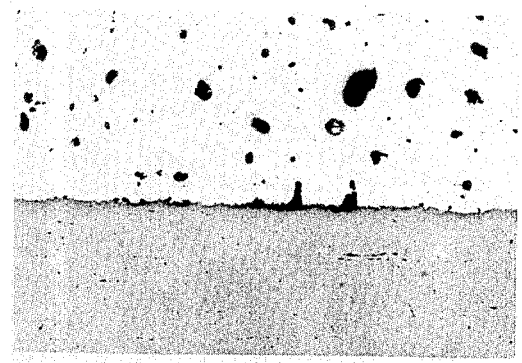
Figure 14:
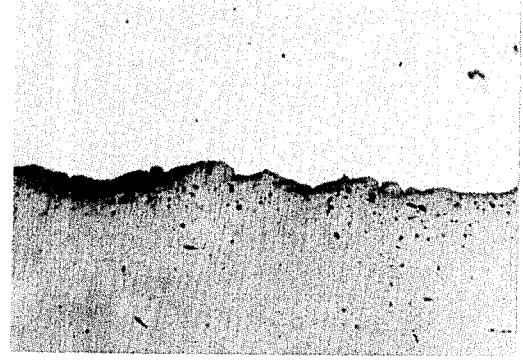

FIGS. 14 (a) and (b) are microphotographs, of 100 and 400 magnifications respectively, of the joined surface between the hollow component and the hollow bush of said joined composite part shown in FIG. 12.

Figure 16:
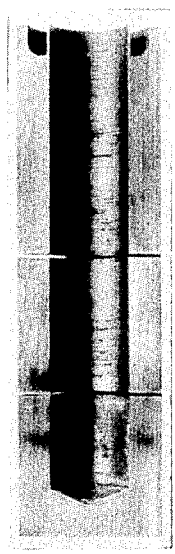
Figure 17:
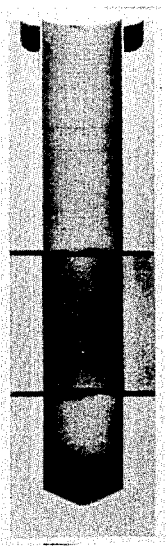
Figure 18:
Figure 18:
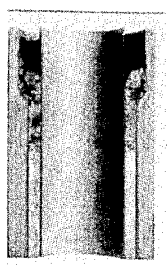
Figure 19:
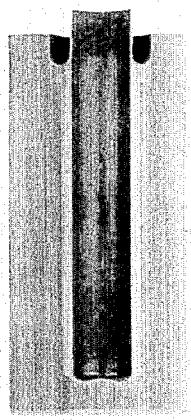
Figure 19:
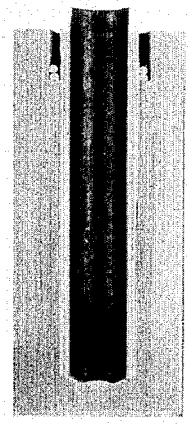
Figure 20:
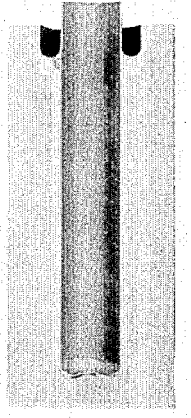
Figure 20:
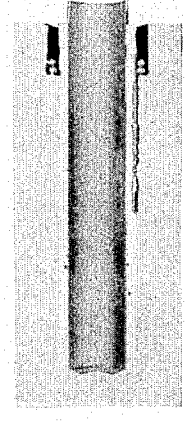
Figure 21:
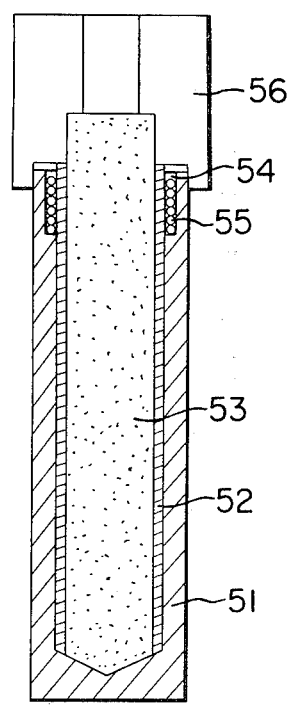
Figure 22:
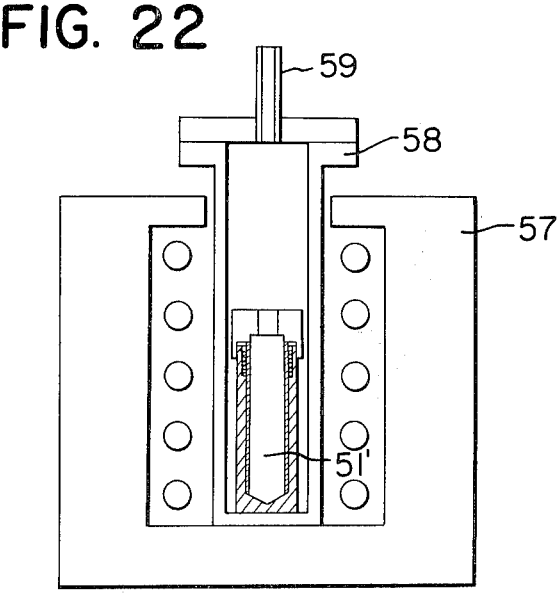
Figure 23:
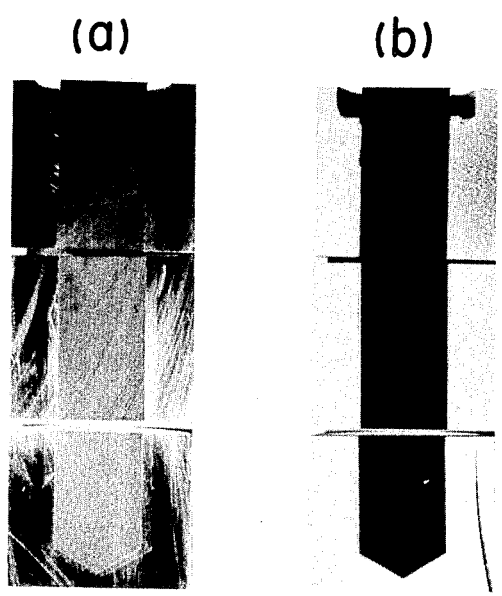

FIG. 15 is a graph which shows measurements of the tin concentration of portions near the respective joined surface between the hollow part of ferrous metal and the hollow part of non-ferrous metal between the hollow part of non-ferrous metal and the core, of said joined composite part shown in FIG. 12. FIG. 15 is a graph which shows measurements of the tin concentration of portions near the respective joined surfaces between the hollow part of ferrous metal and the hollow part of non-ferrous metal and between the hollow part of non-ferrous metal and the core, of said joined composite part shown in FIG. 12;

FIG. 16 is a photograph of the longitudinal section of the joined composite part, diffusion welded in accordance with the second embodiment of this invention;

FIG. 17 is a photograph which shows the result of penetration flaw detecting test of said joined composite part shown in FIG. 16;

FIGS. 18 (a) and (b) are photographs of the longitudinal section of grooves of the joined composite parts, diffusion welded in accordance with second and first embodiments of this invention, respectively;

FIGS. 19 (a) and (b) are photographs of the longitudinal section of the joined composite parts, diffusion welded in accordance with the third and second embodiment, of this invention, respectively;

FIGS. 20 (a) and (b) are photographs which show results of penetration flaw detecting tests of said joined composite parts shown in FIGS. 19 (a) and (b), respectively;

FIG. 21 is a schematic drawing of another embodiment of this invention, wherein a solid round bar made of graphite for electrode is used as a core;

FIG. 22 is a schematic drawing whichc illustrates how the composite part set as shown in FIG. 21 is charged into a treatment furnace for diffusion welding; and FIG. 23 (a) is a photograph of the longitudinal section of the joined composite part, diffusion welded in accordance with the method of this invention as illustrated in FIGS. 21 and 22. FIG. 23 (b) is a photograph which shows the result of penetration flaw detecting test of said joined composite part shown in (b) above.

DETAILED DESCRIPTION OF PREFERRED EMBODIMENTS

The method of this invention is described below in detail with reference to the accompanying drawings.

Figure 1:
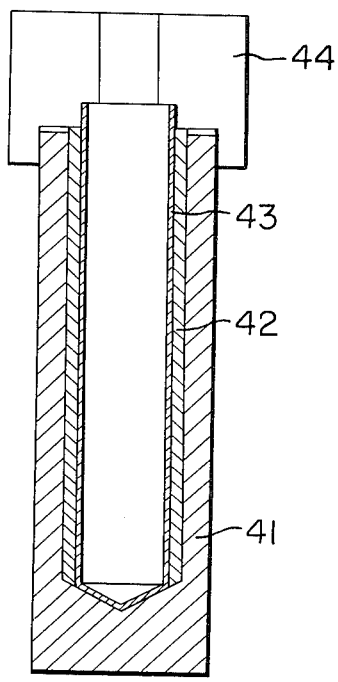
FIG. 1 is a schematic drawing of the conventional method of diffusion welding, wherein a hollow part of non-ferrous metal and a core are set in a hollow part of ferrous metal.
Figure 2:
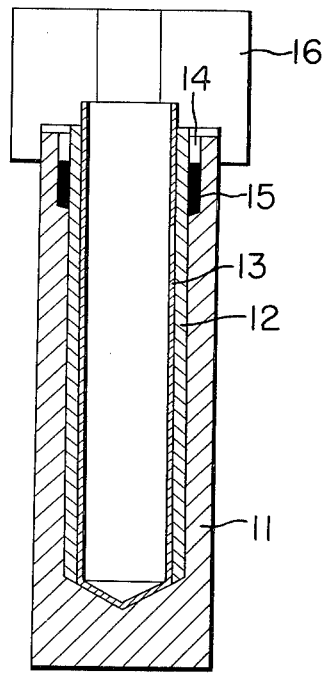
FIG. 2 is a schematic drawing of the first embodiment of this invention, wherein a hollow part of non-ferrous metal, a core and a low melting point metal are set in a hollow part of ferrous metal.
Figure 3:
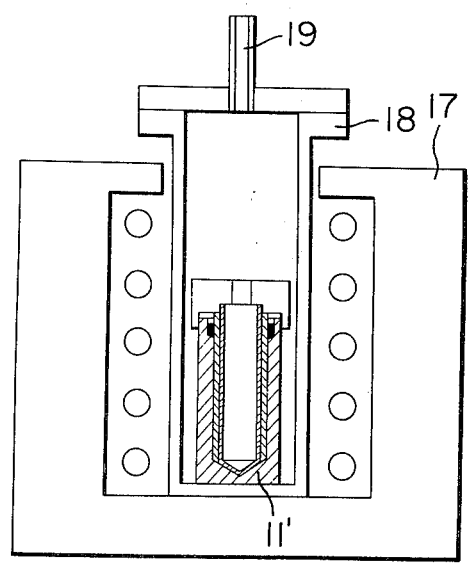
FIG. 3 is a schematic drawing which illustrates how the composite part set as shown in FIG. 2 is charged into a treatment furnace for diffusion welding.

In this invention, as is shown in FIG. 2, a hollow part of non-ferrous metal 12, to be joined onto a hollow part of ferrous metal 11, is first inserted into and in close contact with the bore of said hollow part of ferrous metal 11. Said hollow part of ferrous metal 11 (hereinafter referred to as "hollow component") has the bore of such a cross sectional shape as circle, ellipse, polygon and pentagram, and said hollow part of non-ferrous metal 12 (hereinafter referred to as "hollow bush") has the same inner and outer shapes as the bore of said hollow component 11 and is made of a non-ferrous metal such as copper and copper alloys with a larger coefficient of thermal expansion than said hollow component 11. Then, a core 13 that has the same outer shape as the bore of said hollow bush 12 and is made of a material with a higher strength and a higher melting point than said hollow bush 12 is inserted into and in close contact with the bore of said hollow bush 12. Subsequently, as shown in the figure, a low melting point metal 15 with a lower melting point than said hollow component 11, said hollow bush 12 and said core 13, e.g., tin is charged into a groove 14 prepared at the upper end of said hollow component 11. In FIG. 2, 16 designates a weight having the role of centering. As shown in FIG. 3, the composite part 11' set as mentioned above, is charged into a treatment furnace comprising a heating means 17 and a vacuum means 18, where said composite part 11' is heated to above the creep temperature of said hollow bush 12 under a vacuum of about 5 Torr or less produced by evacuation of air through an evacuation opening 19 or in a non-oxidizing atmosphere under atmospheric pressure, in order to join by diffusion welding said hollow bush 12 onto the inner surface of the bore of said hollow component 11.

As material for said hollow component 11, a steel is selected which has a quality suitable for applications of the product. For example, steel for machine structural use is used for the cylinder block of an axial piston pump or the bearing. As material for said hollow bush 12, a metal that has a larger coefficient of thermal expansion than said hollow component 11 and has excellent sliding property, wear resistance and corrosion resistance, e.g., copper and copper alloys such as bronze is used. The material of said core 13 should have a higher strength and a higher melting point than said hollow bush 12 during heating for diffusion welding and as specifically described later, furthermore, has preferably a larger coefficient of thermal expansion than that of said hollow bush 12. As material for said core 13, a metallic material such as steel, or a non-metallic material such as graphite, ceramic and cermet is used. Said low melting point metal 15 must be a metal with a lower melting point than said hollow component 11, said hollow bush 12 and said core 13 and is preferably selected, as described hereinafter, from constituent elements of said hollow component 11 or said hollow bush 12. In this invention, for example, tin is used as low melting point metal.

The tolerable difference between the inner diameter of the bore of said hollow component 11 and the outer diameter of said hollow bush 12 and the allowance between the inner diameter of the bore of said hollow bush 12 and the outer diameter of said core 13 are dependent upon the size of the bore of said hollow component 11. For example, the difference, may be in both cases less than about 0.5 mm for an inner diameter of the bore of said hollow component 11 of about 100 mm and may be less than about 0.1 mm for an inner diameter of said bore of about 20 mm. The surface roughness of the contact surfaces of said hollow component 11, said hollow bush 12 and said core 13 may be about less that 100 $\mu$. Said core 13 may be in the form of a solid round bar. However, when employing a metallic material such as steel as material of said core 13, said core must be removed by cutting or other methods after cooling, since said core 13 is joined onto the inner surface of the bore of said hollow bush 12 during diffusion welding. Therefore, said core 13 is preferably hollow to shorten the time needed for this removal and to reduce the stress caused by the contraction during cooling. Said low melting point metal 15 may be lumpy or granular. However, said low melting point metal is preferably in the form of annular wire having the same annulus diameter as said annular groove 14. In this case, the annular wire is inserted into said groove 14 in the number corresponding to the necessary amount of the low melting point metal, thus leading to a very simplified weighing operation.

Said composite part 11' set as stated above is charged into a treatment furnace comprising a heating means 17 and a vacuum means 18, as shown in FIG. 3, and the air in the furnace is evacuated through an evacuation opening 19 to obtain a vacuum of less than about 5 Torr. A vacuum at such a low level can be easily obtained with an oil rotary vacuum pump. On heating to above the melting point of said low melting point metal 15, said low melting point metal 15 charged into the groove 14 prepared at the upper end of said hollow component 11 first melts and penetrates, by gravity and capillarity, into a gap formed between said hollow component 11 and said hollow bush 12 and a gap between said hollow bush 12 and said core 13. In this case, filling of said gaps with said low melting point metal is promoted when gases such as $N_2$ and Ar are temporarily enclosed. When said low melting point metal 15 has filled said gaps, the contact surfaces of said hollow component 11 and said hollow bush 12 will not be exposed to the atmosphere in the furnace, thus permitting diffusion welding even under conditions inferior to those required for the conventional diffusion welding.

When the heating temperature is raised to the diffusion welding temperature, i.e., above the creep temperature of said hollow bush 12, with said low melting point metal 15 in liquid phase in said gaps, solid phase-liquid phase diffusion occurs between said hollow component 11 and hollow bush 12 in solid phase and said low melting point metal 15 in liquid phase. In parallel with this process, since the inward deformation of said hollow bush 12 is prevented by the presence of said core 13, said hollow component 11 and said hollow bush 12 get nearer to each other, and finally said two hollow parts 11 and 12 are gradually brought into close contact with each other under pressure, by stress generated from the difference in the thermal expansion between said two hollow parts 11 and 12. In this case, if a material having a larger coefficient of thermal expansion than said hollow bush 12 is used as material of said core 13, for example high-manganese nickel steel, then, said stress, i.e., the contact pressure is larger. As a result, said low melting point metal 15 in liquid phase present in the gap between said two hollow parts 11 and 12 is removed from said gap, and solid phase-solid phase diffusion takes place between said two hollow parts 11 and 12 in solid phase. A contact pressure at the contact surfaces of said two hollow parts 11 and 12 of about 50 g/mm² to about 200 g/mm² is sufficient, and this value is at the same level as the contact pressure for the conventional diffusion welding.

Heating conditions in this invention is quite the same as those in the conventional diffusion welding; that is, heating rate is less than about 30°C/min., holding temperature ranges from about 700°C to about 950°C and holding time ranges from about 30 min. to about 90 min..

As already mentioned, when said low melting point metal 15 is selected from constituent elements of said hollow component 11 or said hollow bush 12, said low melting point metal diffuses into said hollow component or said hollow bush during diffusion welding, so that the phase of said low melting point metal at first unevenly distributed at the joined surface gradually diffuses and decreases. Finally, the joined surface of said hollow component 11 and said hollow bush 12 possesses almost the same composition and structure as in the case of direct joining of both. For example, if said hollow bush 12 is made of bronze, use of tin as said low melting point metal 15 yields satisfactory results; tin is one of the constituent elements of bronze and has a low vapor pressure (melting point: 232°C).

Since substances having a relatively high vapor pressure contained in said composite part 11', e.g., zinc in copper alloys, are gasified in large quantities at high temperatures during heating for diffusion welding, it is difficult to maintain a high vacuum. However, in this invention as already mentioned, diffusion welding can be performed under a low vacuum of about 5 Torr, and generation of gases does not impede the process only if said gases are non-oxidizing such as zinc gas.

After completion of diffusion welding of this invention according to the above-mentioned procedure, the joined composite part 11' is taken out of said treatment furnace. In order to prevent the spalling and cracking of joined portion during cooling, it is desirable that said joined composite part 11' is taken out of said furnace and air-cooled after said part 11' is gradually cooled to about 400°C at a rate of less than about 10°C/min. in said treatment furnace.

In the case where a metallic material such as steel is used as material of said core 13, said core 13 is also joined onto the inner surface of the bore of said hollow bush 12 during the above-mentioned diffusion welding. When said core 13 has a smaller coefficient of thermal expansion than said hollow bush 12, only solid phase-liquid phase diffusion takes place between said hollow bush 12 and said core 13 in solid phase and said low melting point metal 15 in liquid phase. On the other hand, when said core 13 has a larger coefficient of thermal expansion than said hollow bush 12, solid phase-solid phase diffusion occurs between said hollow bush 12 and said core 13 in solid phase after said solid phase-liquid phase diffusion. Although the inward deformation of said hollow bush 12 can be better prevented in the latter case, satisfactory results can be obtained in both cases.

Said core 13 is completely removed by withdrawing, cutting or other method after cooling of said joined composit part 11' to obtain a joined cylindrical product.

For the rationalization of operation or for the convenience of operation, an intermediate product may be diffusion welded later as stated above, said intermediate product being produced by stopping the heating and starting the cooling upon penetration of said low melting point metal into said gaps formed among said hollow component, said hollow bush and said core. In this case, if said low melting point metal is supplied in a quantity exactly corresponding to the quantity needed to fill said gaps, voids are formed in said gaps due to shrinkage of said low melting point metal that has filled said gaps and solidified, thus leading to formation of oxidized layers at the surfaces to be joined. Such oxidized layers have adverse effect on joining strength. Therefore, said low melting point metal must be charged into said groove in such a quantity that an excess of said low melting point metal remains a little within said groove after filling of said gaps. Besides, during heating for diffusion welding, low melting point metal in liquid phase in said gaps is discharged from said gaps into said groove and remains therein in the process of decrease and disappearing of said gaps.

An excess of said low melting point metal in liquid phase remaining within said groove reacts with one or both of said hollow component and said hollow bush in solid phase in contact with said low melting point metal to produce an alloyed phase. For example, when bronze is used for the hollow bush and tin is used as low melting point metal, an excess of tin remaining within said groove reacts with said hollow bush (bronze) to produce an alloyed phase with a high tin concentration. This alloyed phase is hard but brittle, thus causing spalling or cracking at joined portions. When said alloyed phase reduces the mechanical properties and corrosion resistance of the joined cylindrical product as in this case, a portion of the product where said alloyed phase is present must be cut off. Therefore, surplus lengths corresponding to cut-off lengths must be provided beforehand for said hollow component, said hollow bush and said core. This leads to an increase in cost and is uneconomical. Moreover, it is exceedingly difficult to select a low melting point metal that will not form said alloyed phase.

Figure 4:
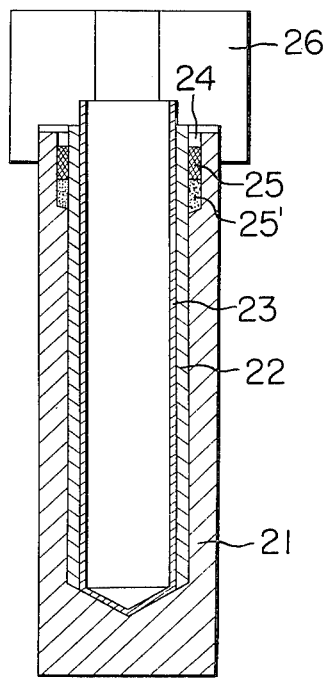
FIG. 4 is a schematic drawing of the second embodiment of this invention, wherein a hollow part of non-ferrous metal, a core, a low melting point metal and an alloying metal are set in a hollow part of ferrous metal.

The formation of such an undesirable alloyed phase can be prevented by charging an alloying metal that reacts with said low melting point remaining within said groove to produce an alloy having almost the same composition as one or both of said hollow component and said hollow bush, into said groove together with said low melting point metal and effecting diffusion welding as stated above. For example, when said hollow bush is made of bronze, tin 25 as low melting point metal and copper 25' as alloying metal are both charged into a groove 24, as shown in FIG. 4, and diffusion welding is effected as stated above. Tin 25 remains within said groove 24, after filling a gap formed between a hollow component 21 and a hollow bush 22 and a gap between said hollow bush 22 and a core 23, and reacts with copper 25' in said groove 24 to produce an alloy having almost the same composition as said hollow bush (bronze). Therefore, formation of an undesirably brittle alloyed phase as mentioned above can be substantially prevented, and said hollow component 21 and said hollow bush 22 can be firmly and uniformly joined together without spalling or cracking.

Said low melting point metal 25 and said alloying metal 25' may be lumpy or granular as shown in FIG. 4. However, as shown in the partially enlarged views of FIGS. 8 and 10, when an annular low melting point metal wire 25 and an annular alloying metal wire 25', both having the same annulus diameter as the annular groove 24 of hollow component 21, are used, said annular wires can be charged into said groove in the number corresponding to the necessary amount, thus leading to a very simplified weighing operation. Whichever of said low melting point metal 25 and said alloying metal 25' may be placed one below the other when they are charged into said groove. However, melting of said alloying metal 25' is promoted with better results, when said alloying metal 25' is placed lower. In FIGS. 8 and 10, 22 designates a hollow bush and 23 designates a core.

Accurate weighing of said low melting point metal and said alloying metal, as well as accurate determination of the weight ratio between said two metals, is necessary for preventing formation of voids in said gap formed between said hollow component and said hollow bush and said gap between said hollow bush and said core due to shrinkage of low melting point metal during cooling after filling of said gaps, for producing an alloyed phase having almost the same composition as one or both of said hollow component and said hollow bush, and for other various reasons. Therefore, when joined cylindrical products are to be produced in large quantities, much labor and time are required for the accurate weighing of said low melting point metal and said alloying metal at each time. Moreover, as shown in the partially enlarged view of FIG. 8, when an alloying metal wire 25' is placed in the groove 24 of a hollow component 21, a low melting point metal wire 25 is placed on said alloying metal wire 25', and then diffusion welding is effected, said low melting point metal wire 25 melts and reacts with said alloying metal wire 25' to produce an alloy, as already mentioned. In this case, if the diameter of said alloying metal wire 25' is too large, said alloying metal wire can not completely melt, does not form an alloyed phase with the low melting point metal wire 25 and remains within said groove 24, with the result that a brittle phase abounding with low melting point metal is formed in and near said groove 24, and desired alloyed phases may not be obtained.

Formation of such an undesirable alloyed phase can be prevented by reducing the diameter, or the sectional area (sectional volume), of said alloying metal wire 25'. When said sectional area is small, all of said alloying metal wire 25' melts and does not remain in unmolten condition, thus resulting in desired alloyed phase.

In order to attain the above-mentioned simplification of weighing of low melting point metal and alloying metal and, at the same time, to reduce the diameter of alloying metal wire, it is desirable that an annular composite metal wire having the same annulus diameter as said annular groove composed of a core of alloying metal wire coated with a sheath of low melting point metal is used.

Next, the extent which the sectional area of said alloying metal wire can be reduced by using said composite metal wire is illustrated with reference to FIGS. 9 and 10. In FIG. 9, two annular composite metal wires 35 are charged into a groove 34. Said annular composite metal wire 35 is composed of a core 35'' of copper wire as alloying metal coated with a sheath 35' of tin as low melting point metal, with the ratio of sectional areas between both of 1 : 1. In FIG. 9, 31 designates a hollow component, 32 designates a hollow bush, and 33 designates a core. The outer diameter of said copper wire 35'' is 1.4 mm, and that of said composite metal wire 35 is 2.0 mm. In FIG. 10, an annular tin wire 25 with an outer diameter of 2.0 mm as low melting point metal and an annular copper wire 25' with an outer diameter of 2.0 mm as alloying metal are charged into a groove 24. In this drawing, 21 designates a hollow component, 22 designates a hollow bush, and 23 designates a core. As apparent from FIGS. 9 and 10, although copper wire and tin wire have the same total sectional area (sectional volume), the outer diameter of copper wire 35'' in the case of use of a composite metal wire as shown in FIG. 9 is only 1.4 mm against that of copper wire 25' of 2.0 mm in the case of simultaneous use of a tin wire and a copper wire as shown in FIG. 10. Therefore, when composite metal wires are used, the diameter of copper wire can extremely be reduced with the same quantity of copper maintained. As a result, copper wires as alloying metal will never remain unmolten in the groove, thus leading to a complete prevention of forming of any alloyed phase with undesirable composition in the groove. In addition, since annular composite metal wires are charged into said groove in the number corresponding to quantity required, weighing operation is considerably simplified.

The ratio of sectional areas between low melting point metal and alloying metal in said composite metal wire is suitably decided according to use conditions.

Next, the method of this invention is described in more detail with reference to some embodiments.

EXAMPLE 1

Example 1 is the first embodiment of this invention which uses low melting point metal.

As shown in FIG. 2, a hollow bush 12 to be joined onto the inner surface of a hollow component 11 was, after degreasing and washing, inserted into and in close contact with the bore of said hollow component 11, also degreased and washed beforehand. A core 13 was then inserted into and in close contact with the bore of said hollow bush 12.

As material of said hollow component 11, carbon steel for machine structural use (JIS.S15CK; C: 0.13–0.18%, Si: 0.15–0.35%, Mn: 0.30–0.60%, P: up to 0.025%, S: up to 0.025%) was used, and a cylinder block with an inner diameter of 22.5 mm and a surface roughness of its inner surface of 35μ was produced. As material of said hollow bush 12, bronze (JIS. BC3; Cu: 86.5–89.5%, Sn: 9.0–11.0%, Zn: 1.0–3.0%, Pb: up to 1.0%) was used, and a cylinder with an outer diameter of 22.4 mm, an inner diameter of 18.0 mm, and a surface roughness of its inner and outer surfaces of 35μ was produced. As material of said core 13, the same steel as for said hollow component 11 was used, and a cylinder with an outer diameter of 17.9 mm, an inner diameter of 16.0 mm, and a surface roughness of its outer surface of 35μ was produced.

As low melting point metal to penetrate into a gap formed between said hollow component 11 and said bush 12 and a gap between said bush 12 and said core 13, granular pure tin 15 was selected which is one of the constituent elements of said hollow bush 12 and has a low vapor pressure, and 4g of granular pure tin 15 was charged into a groove 14 prepared at the upper end of said hollow component 11. Then, as shown in FIG. 2, a weight 16 having a role of centering at the same time was fitted onto and in close contact with the upper end of thus set composite part.

Said composite part 11' thus set was, as shown in FIG. 3, charged into a treatment furnace comprising a heating means 17 and a vacuum means 18, and heating was started with simultaneous evacuation of air through an evacuation opening 19 to a level of 0.5–2.0 Torr. Heating rate was 10°C/min., holding temperature was 850°C, and holding time was 60 min. Then, thus joined composite part 11' was taken out of said treatment furnace and air-cooled, after gradual cooling to 400°C at a rate of 5°C/min. Said weight 16 was then taken out, and said core 13 joined onto the inner surface of the bore of said hollow bush 12 was removed by cutting to produce a joined cylindrical product.

FIG. 12 is a photograph of the longitudinal section of said joined composite part, diffusion welded in this Example 1. As shown in the photo, no defect is observed in the joined surface between said hollow component and said hollow bush except near the groove where tin was charged. Defects observed in the portion near the groove where tin was charged are cracks formed by stress during cooling, since in this portion said tin reacted with said hollow bush (bronze) to produce an alloyed brittle phase with a high tin concentration.

Figure 13:
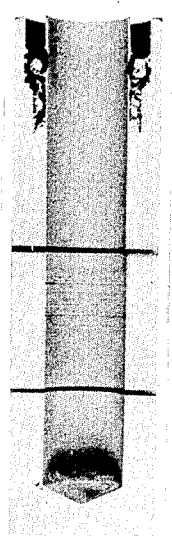
FIG. 13 is a photograph which shows the result of penetration flaw detecting test of said joined composite part shown in FIG. 12.

FIG. 13 is a photograph which shows the result of penetration flaw detecting test of said joined composite part shown in FIG. 12. No defect is observed except in the alloyed phase portion composed of tin and bronze as mentioned above.

FIGS. 14 (a) and (b) are microphotographs, of 100 and 400 magnifications respectively, of the joined surface between the hollow component and the hollow bush of said joined composite part shown in FIG. 12. As apparent from the photos, no defect is observed in said joined surface.

FIG. 15 is graphs which show measurements of the tin concentration of portions near the joined surface between said hollow component and said hollow bush and the joined surface between said hollow bush and said core, of said joined composite part shown in FIG. 12. As is apparent from the figure, a phase with a high tin concentration is observed in the portion near the joined surface between said hollow bush and said core, while such a phase with a high tin concentration is not observed in the portion near the joined surface between said hollow component and said hollow bush. This results, as already mentioned, from the fact that tin in liquid phase was removed from the gap between said hollow component and said hollow bush in the course of decrease and disappearance of the gap due to the difference in thermal expansion during heating for diffusion welding. Since a phase with a high tin concentration is hard but brittle, it is undesirable that such a phase should remain in a portion of joined surfaces. However, only the joined surface between said hollow component and said hollow bush remains, and the joined surface between said hollow bush and said core is completely removed together with said core when said core is, as already mentioned, removed by cutting. Therefore, presence of a phase having a high tin concentration in the joined surface between said hollow bush and said core is not serious at all.

Next, said composite part shown in FIG. 12 was cut downward from the upper ends to five joining strength test pieces of a length of 10 mm. These test pieces S were fixed between jigs X and Y of a joining strength measuring device shown in FIG. 11, and load W was applied from above and below to determine the shearing force that breaks the joined surface between said hollow component and said hollow bush. The five test pieces showed shearing strengths of 16.2 kg/mm$^2$, 27.6 kg/mm$^2$, 26.6 kg/mm$^2$, 26.5 kg/mm$^2$ and 25.5 kg/mm$^2$ in the order from the uppermost to the lowest test pieces. That the uppermost test piece showed a shearing strength of 16.2 kg/mm$^2$, by far lower than those of the other test pieces, results from the fact that an excess of tin remaining within said groove reacted with said hollow bush to produce a brittle phase with a high tin concentration. This portion is designed to be cut off as suplus length of said joined cylindrical product.

EXAMPLE 2

Example 2 is the second embodiment of this invention which uses low melting point metal and alloying metal at the same time.

As shown in FIG. 4, a hollow bush 22 was inserted into and in close contact with the bore of a hollow component 21 in the same manner as in Example 1, and a core 23 was then inserted into and in close contact with the bore of said hollow bush 22. Said hollow component 21, said hollow bush 22 and said core 23 had the same material, shape, size and surface roughness as in Example 1.

Into a groove 24 prepared at the upper end of said hollow component 21 were charged 4g of granular pure tin 25 as low melting metal and 4g of granular pure copper 25' as alloying metal. Then, as shown in FIG. 4, a weight 26 having a role of centering at the same time was fitted onto and in close contact with the upper end of thus set composite part.

Figure 5:
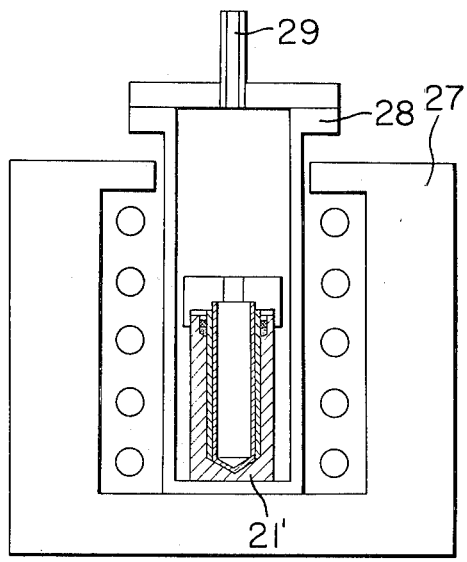
FIG. 5 is a schematic drawing which illustrates how the composite part set as shown in FIG. 4 is charged into a treatment furnace for diffusion welding.

Said composite part 21' thus set was, as shown in FIG. 5, charged into a treatment furnace comprising a heating means 27 and a vacuum means 28 and diffusion welding was effected under the same treatment conditions as in Example 1 with simultaneous evacuation of air through an evacuation opening 29 to a level of about 0.5-2.0 Torr. Then, in the same manner as in Example 1, thus joined composite part 21' was taken out of said treatment furnace after cooling, said weight 26 was taken off and said core 23 was removed to produce a joined cylindrical product.

FIG. 16 is a photograph of the longitudinal section of said joined composite part, diffusion welded in this Example 2. As shown in the photo, defect is observed neither in the joined surface between said hollow component and said hollow bush nor in said groove portion.

FIG. 17 is a photograph which shows the result of penetration flaw detecting test of said joined composite part shown in FIG. 16. Defect is nowhere observed also in this photo.

FIG. 18 (a) is a photograph of the longitudinal section of the groove portion of the joined composite part, diffusion welded in this Example 2 in which tin as low melting point metal and copper as alloying metal were used at the same time. FIG. 18 (b) is a photograph, for comparison, of the longitudinal section of the groove portion of the joined composite part, diffusion welded in above-mentioned Example 1 in which only tin as low melting point metal was used. The sectional surfaces of test pieces in FIGS. 18 (a) and (b) were both caused to be eroded with a hydrochloric acid — ferric chloride — alcohol solution with a view to observing the microstructures. As shown in the photo (a) illustrating this Example 2, tin and copper produce in the groove portion an alloy which shows almost the same structure as said hollow bush (bronze). On the contrary, in photo (a) illustrating Example 1, cracks occur over the portion from the groove up to about 15 mm deep. This results from the fact that surplus tin remaining in the groove reacted with said hollow bush (bronze) to produce an alloyed brittle phase with a high tin concentration and cracks were formed by contraction stress during cooling.

EXAMPLE 3

Example 3 is the third embodiment of this invention which uses composite metal wire composed of a core of alloying metal wire coated with a sheath of low melting point metal.

Figure 6:
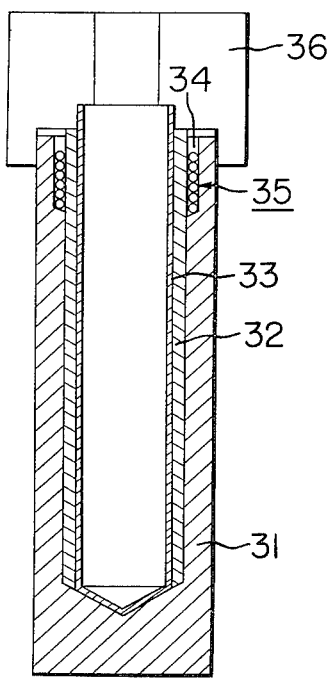
FIG. 6 is a schematic drawing of the third embodiment of this invention, wherein a hollow part of non-ferrous metal, a core and a composite metal wire composed of a core of alloying metal coated with a sheath of low melting point metal are set in a hollow part of ferrous metal.

As shown in FIG. 6, a hollow bush 32 was inserted into and in close contact with the bore of a hollow component 31 in the same manner as in Example 1, and a core 33 was then inserted into and in close contact with the bore of said hollow bush 32. Said hollow component 31, said hollow bush 32 and said core 33 had the same material, shape, size and surface roughness as in Example 1.

Into a groove 34 prepared at the upper end of said hollow component 31 was charged 11.2 g of annular composite metal wire 35 with an outer diameter of 2.0 mm composed of a core of pure copper wire with an diameter of 1.4mm coated with a sheath of pure tin, with the ratio of sectional areas (sectional volumes) between tin and copper of 1 : 1. Then, as shown in FIG. 6, a weight 36 having a role of centering at the same time was fitted onto and in close contact with the upper end of thus set composite part.

Figure 7:
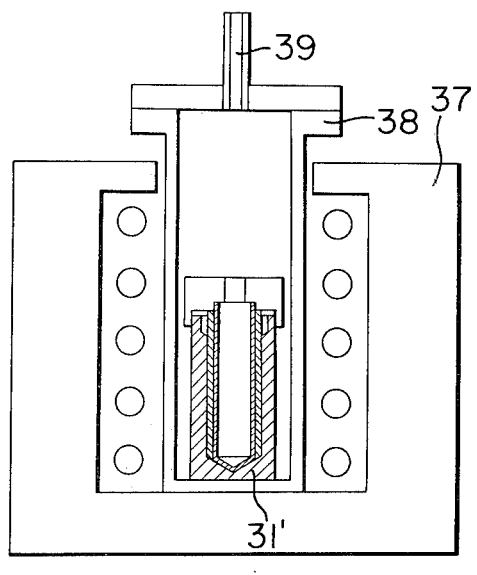
FIG. 7 is a schematic drawing which illustrates how the composite part set as shown in FIG. 6 is charged into a treatment furnace for diffusion welding.

Said composite part 31' thus set was, as shown in FIG. 7, charged into a treatment furnace comprising a heating means 37 and a vacuum means 38, and heating was started with simultaneous evacuation of air through an evacuation opening 39 to a level of about 1 Torr. Heating rate was 30°C/min, holding temperature was 900°C, and holding time was 60 min. Then, thus joined composite part 31' was taken out of said treatment furnace and aircooled, after gradual cooling to 400°C at the rate of 10°C/min. And in the same manner as in Example 1, said weight 36 was taken off, and said core 33 was removed to produce a joined cylindrical product.

FIG. 9 (a) is a photograph of the longitudinal section of said joined composite part, diffusion welded in this Example 3. As shown in the photo, tin and copper that are constituent elements of said composite metal wire produce in the groove portion an alloy which has almost the same composition as said hollow bush (bronze), and no unmolten copper wire remains. FIG. 19 (b) is a photograph of the longitudinal section of the joined composite part, diffusion welded under the same treatment conditions as this Example 3, except that the same quantity of tin wires with an outer diameter of 2.0 mm and copper wires with an outer diameter of 2.0 mm were used instead of said composite metal wires, where copper wires which became slender due to reaction with tin are observed remaining in the groove portion. The same test was repeated 45 times, and it was revealed that when said composite metal wires were used, copper wire did not remain unmolten in the groove in any case, whereas, when tin wires and copper wires were used at the same time, copper wires remained unmolten in the groove in 11% of the tests.

FIGS. 20 (a) and (b) are photographs which show results of penetration flaw detecting tests of the joined composite parts shown in FIGS. 19 (a) and (b), respectively. As is apparent from the photos, defect is nowhere observed in FIG. 20 (a) illustrating an example in which composite metal wires were used. On the contrary, defects are observed from the groove to the middle of the joined surface in FIG. 20 (b) illustrating an example in which tin wires and copper wires were used at the same time, and part of copper wires remained unmolten. It is considered that these defects are cracks which occurred, in an alloyed brittle phase with a high tin concentration, by contraction stress generated during cooling.

EXAMPLE 4

Example 4 is also another embodiment of this invention in which a solid round bar made of graphite for electrode was used as a core.

As shown in FIG. 21, a hollow bush 52 was inserted into and in close contact with the bore of a hollow component 51 in the same manner as in Example 1, and a core 53 was then inserted into and in close contact with the bore of said hollow bush 52. Said hollow component 51 and said hollow bush 52 had the same material, shape, size and surface roughness as in Example 1. Said core 53, made of graphite for electrode, had an outer diameter of 17.9 mm and was finished into a solid round bar.

Into a groove 54 prepared at the upper end of said hollow component 51, 11.2g of annular composite metal wire 55 with the same composition, shape and size as in Example 3 was charged. Then, as shown in FIG. 21, a weight 56, playing also the role of centering, was fitted onto and in close contact with the upper end of thus set composite part.

Said composite part 51' thus set was, as shown in FIG. 22, charged into a treating furnace comprising a heating means 57 and a vacuum means 58, and diffusion welding was applied under the same treating conditions as in Example 3, while evacuating said furnace through an evacuating opening 59 down to about 1 Torr. Then, in the same manner as in Example 3, thus joined composite part 51' was taken out of said treatment furnace after cooling, said weight 56 was taken off and said core 53 was removed to produce a joined cylindrical product.

FIG. 23 (a) is a photograph representing the longitudinal section of said joined composite part, diffusion welded in this Example 4. FIG. 23 (b) is a photograph which shows the result of penetration flaw detecting test of said joined composite part shown in (a) above. As is evident from (a) and (b) above, said hollow component and said hollow bush show a satisfactory state of joining and almost no defect is observed.

Since above-mentioned Examples 1 to 4 all relate to the production of cylinder blocks, the shape of cross section of the joined surfaces between hollow component and hollow bush is round. However, the application of this invention is not limited to the production of products having such a joined surface of round cross section as mentioned above. Even if said cross section is elliptical, polygonal, pentagram or of other shapes, diffusion welding is possible in quite the same manner as in the case of said round cross section, by working said hollow component, said hollow bush and said core to the corresponding shape.

For the same reason, above-mentioned Example 1 to 4 all relate to the production of joined cylindrical products having a bottom, but the application of this invention is not limited to this. Joined cylindrical products without bottom can be easily produced according to the method of this invention, by using an appropriate surface plate and preparing a joint between said composite part and said surface plate in order to prevent said low melting point metal in liquid phase and/or said alloying metal in liquid phase from flowing out.

This invention, which is principally useful for improving for the sliding property, wear resistance, corrosion resistance, etc. of the inner surface of a hollow part of ferrous metal such as cylinder and bearing, it is also widely applicable in joining by diffusion welding a hollow part of non-ferrous metal onto the inner surface of the bore of a hollow part of ferrous metal.

This invention produces industrially useful effect in such points as mentioned below:

1. A hollow part of non-ferrous metal can be easily, firmly and uniformly joined onto the inner surface of the elongated bore of a hollow part of ferrous metal.

2. When a plurality of cylinder holes are provided on a steel block as in the case of a multipiston cylinder block, bushes of non-ferrous metal can be joined onto the inner surfaces of all the cylinder holes at the same time at a single diffusion welding operation.

3. Since low melting point metal is present in the contact surfaces to be joined during heating for diffusion welding, also solid phase — liquid phase diffusion takes place prior to solid phase — solid phase diffusion, thus permitting complete diffusion welding of very complicated surfaces to be joined. Therefore, diffusion welding is possible for a surface roughness coarser than those required for the conventional diffusion welding, resulting in lower manufacturing costs of parts.

4. Higher joining strength prevents the formation of spalling and cracking in the joined portion and produces less defective portions. Therefore, a higher product yield is ensured, and this in turn results in lower costs.

5. Since low melting point metal cleans the contact surfaces between said hollow component and said hollow bush, diffusion welding is possible under a lower vacuum and in a more unfavourable atmosphere than those required for the conventional diffusion welding.

6. Since special joining materials such as brazing filler metal and flux are not used and complicated processes are unnecessary, even unskilled operators can operate satisfactorily.

What is claimed is:

1. A method of joining by diffusion welding a hollow part of non-ferrous metal onto the inner surface of the bore of a hollow part of ferrous metal comprising the steps of inserting said hollow part of non-ferrous metal with a larger coefficient of thermal expansion than said hollow part of ferrous metal, into and in close contact with the bore of said hollow part of ferrous metal, then inserting a core of a material with a higher strength and a higher melting point than said hollow part of non-ferrous metal into and in close contact with the bore of said hollow part of non-ferrous metal, and subsequently heating the composite part thus set to a diffusion welding temperature under a relatively low vacuum or in a non-oxidizing atmosphere under atmospheric pressure, characterized by: causing a low melting point metal in liquid phase having a lower melting point than said hollow part of ferrous metal, said hollow part of non-ferrous metal and said core to penetrate into a gap formed between said hollow part of ferrous metal and said hollow part of non-ferrous metal and a gap between said hollow part of non-ferrous metal and said core; then carrying out heating to a diffusion welding temperature to effect solid phase-liquid phase diffusion between said hollow part of ferrous metal and said hollow part of non-ferrous metal in solid phase and said low melting point metal in liquid phase; and, at the same time, effecting solid phase-solid phase diffusion between said hollow part of ferrous metal and said hollow part of non-ferrous metal in solid phase, by bringing said hollow part of ferrous metal and said hollow part of non-ferrous metal into contact with each other under pressure through the use of stress generated from the difference in thermal expansion between said hollow part of ferrous metal and said hollow part of non-ferrous metal while preventing said hollow part of non-ferrous metal from being deformed inward by means of said core.

2. The method of claim 1, characterized by using an alloying metal together with said low melting point metal, which reacts with an excess of said low melting point metal, remaining in liquid phase within a groove prepared at the upper end of said hollow part of ferrous metal, to produce an alloyed phase having almost the same composition as one or both of said hollow part of ferrous metal and said hollow part of non-ferrous metal, whereby said low melting point metal in excess is prevented from reacting with one or both of said hollow part of ferrous metal said hollow part of non-ferrous metal to produce an alloyed phase with unfavorable mechanical properties and a low corrosion resistance.

3. The method of claim 2, characterized by using a composite metal wire composed of a core of said alloying metal wire coated with a sheath of said low melting point metal instead of using said alloying metal together with said low melting point metal.

* * * * *